United States Patent
Griffioen et al.

(10) Patent No.: US 6,848,541 B2
(45) Date of Patent: Feb. 1, 2005

(54) OPTICAL CABLE INSTALLATION WITH CABLE LUBRICATOR

(75) Inventors: Willem Griffioen, Ter Aar (NL); Maja Keijzer, Delft (NL); Cornelus Van T'Hul, Den Hoorn (NL); Willem Greven, Delfzijl (NL)

(73) Assignee: NKF Kabel B.V., Gouda (NL)

( * ) Notice: Subject to any disclaimer, the term of this patent is extended or adjusted under 35 U.S.C. 154(b) by 8 days.

(21) Appl. No.: 10/194,034

(22) Filed: Jul. 11, 2002

(65) Prior Publication Data

US 2004/0007699 A1 Jan. 15, 2004

(51) Int. Cl.[7] ............................................. F16N 13/22
(52) U.S. Cl. ..................................... 184/15.2; 184/15.1
(58) Field of Search ...................... 184/14, 15.1, 15.2, 184/16, 17; 254/134.4, 134.3 R

(56) References Cited

U.S. PATENT DOCUMENTS

| | | | |
|---|---|---|---|
| 4,185,809 A | | 1/1980 | Jonnes |
| 4,331,322 A | * | 5/1982 | Woodruff ............ 254/134.3 FT |
| 4,468,003 A | | 8/1984 | Nonclercq et al. |
| 4,569,420 A | * | 2/1986 | Pickett et al. .............. 184/15.1 |
| 4,822,005 A | | 4/1989 | Aleshire |
| 4,934,662 A | | 6/1990 | Griffioen et al. |
| 5,121,901 A | | 6/1992 | Cassidy et al. |
| 5,645,267 A | * | 7/1997 | Reeve et al. ............. 254/134.4 |
| 5,699,996 A | | 12/1997 | Boyle et al. |
| 5,732,934 A | | 3/1998 | Sano et al. |
| 5,884,384 A | | 3/1999 | Griffioen |
| 5,946,788 A | | 9/1999 | Griffioen et al. |
| 5,950,298 A | | 9/1999 | Griffioen et al. |
| 5,971,035 A | | 10/1999 | Griffioen |
| 6,024,387 A | | 2/2000 | Griffioen et al. |
| 6,047,954 A | | 4/2000 | Griffioen |
| 6,089,546 A | | 7/2000 | Griffioen et al. |
| 6,115,937 A | | 9/2000 | Griffioen |
| 6,116,578 A | | 9/2000 | Pruett |
| 6,129,341 A | | 10/2000 | Griffioen et al. |
| 6,173,107 B1 | | 1/2001 | Reeve et al. |
| 6,176,022 B1 | | 1/2001 | Willem |
| 6,311,953 B1 | | 11/2001 | Lang et al. |
| 6,328,283 B1 | | 12/2001 | Reeve et al. |
| 6,364,290 B1 | | 4/2002 | Barker |
| 6,402,123 B1 | | 6/2002 | Rivard |
| 6,405,998 B1 | | 6/2002 | Griffioen |

FOREIGN PATENT DOCUMENTS

| | | |
|---|---|---|
| DE | 4202147 A1 | 7/1993 |
| FR | 2501927 | 9/1982 |
| FR | 2655783 | 6/1991 |
| JP | 2001309519 | 11/2001 |
| WO | WO 01/46735 A2 | 6/2001 |
| WO | WO 01/46735 | 6/2001 |

* cited by examiner

*Primary Examiner*—David M. Fenstermacher
(74) *Attorney, Agent, or Firm*—Dennis T. Griggs

(57) ABSTRACT

A cable is installed in a guide tube by means of blowing (and, optionally, synergetic pushing) and lubricating the cable during this installation. Lubricating the cable is done after the cable has passed the cable blowing equipment and hence takes place in a pressurized airflow passage. A hollow chamber filled with foam-plugs saturated with lubricant forms the cable lubricator. To avoid buckling, cable guide blocks are placed, which also divide the lubricator in different sub-chambers, each with its own foam-plug and content of lubricant. The airflow, needed to propel the cable during blowing, can bypass the lubricator.

26 Claims, 5 Drawing Sheets

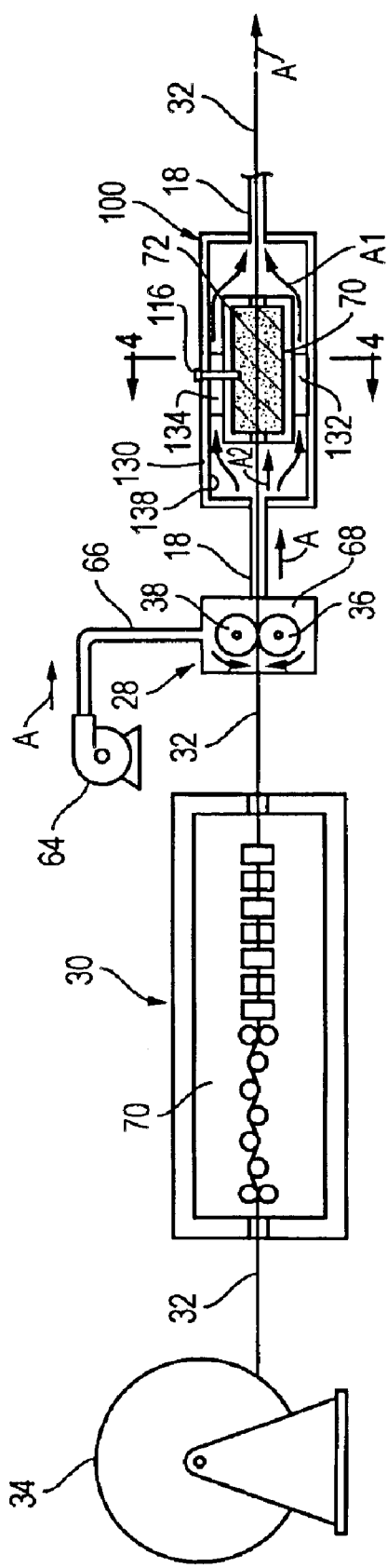
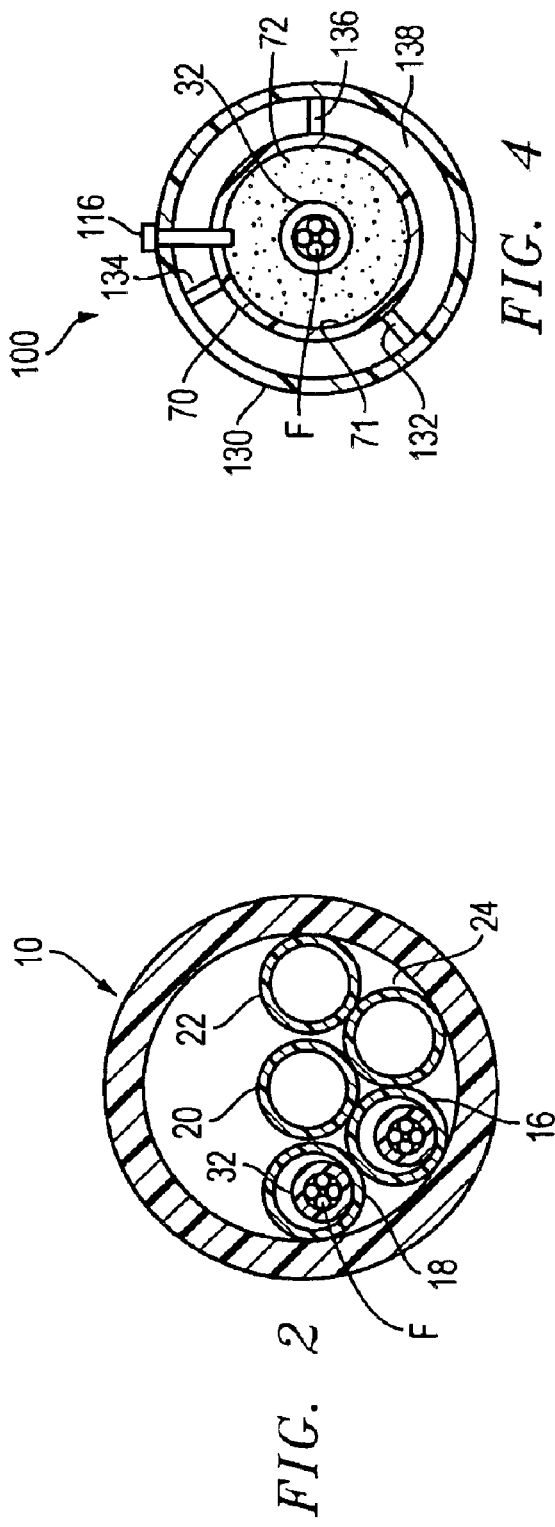
FIG. 3
FIG. 4
FIG. 2

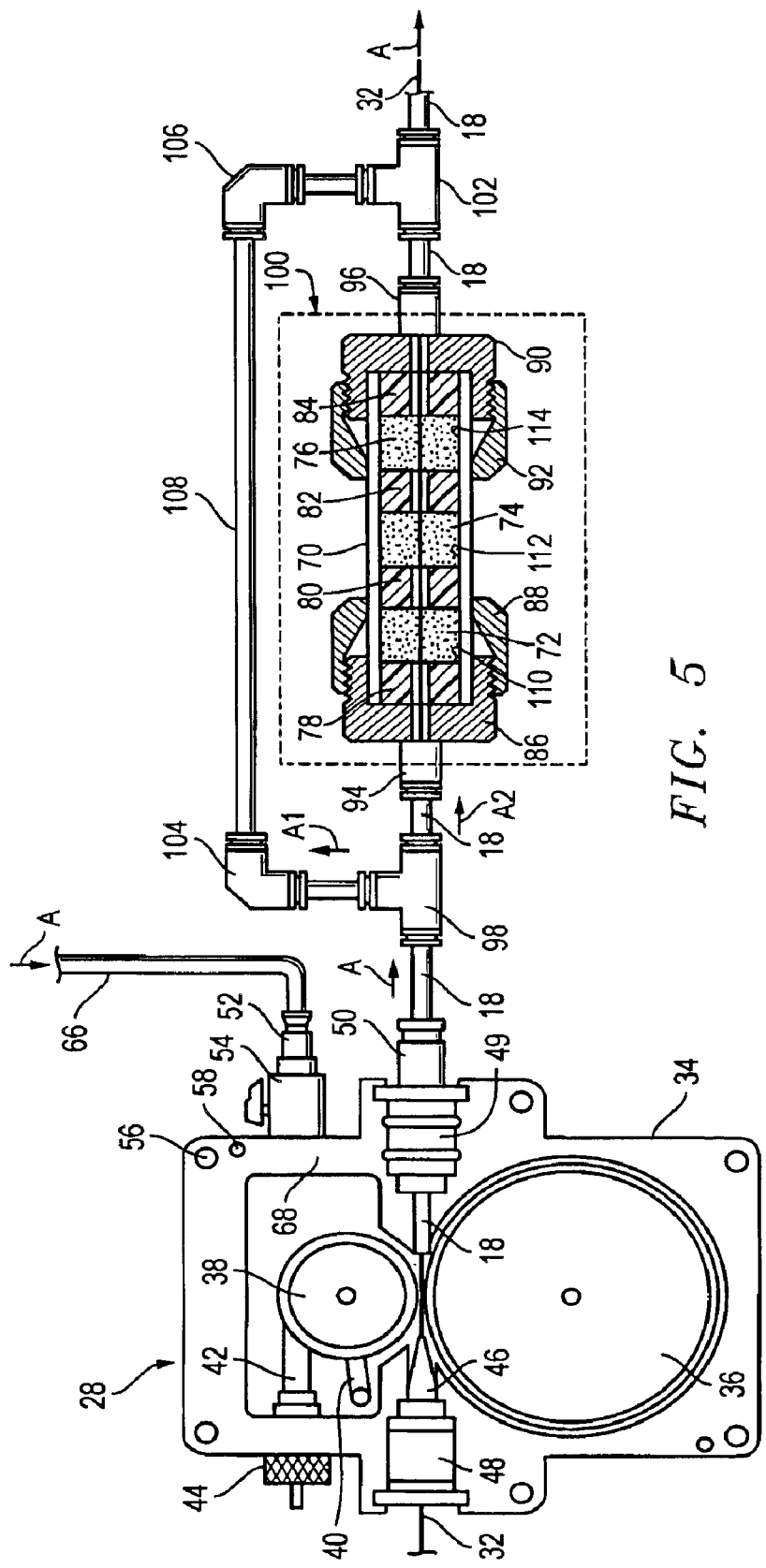
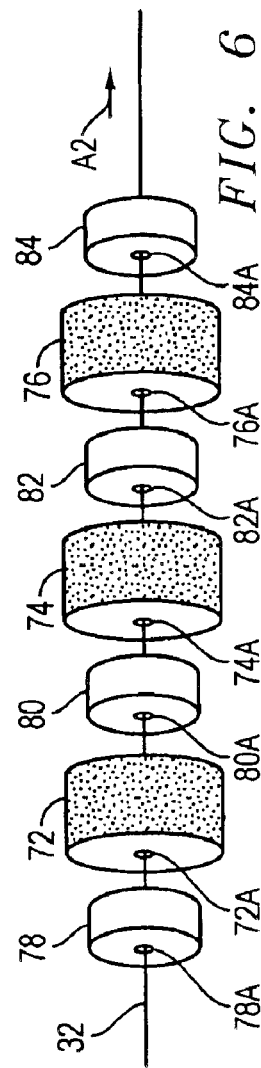
FIG. 5
FIG. 6

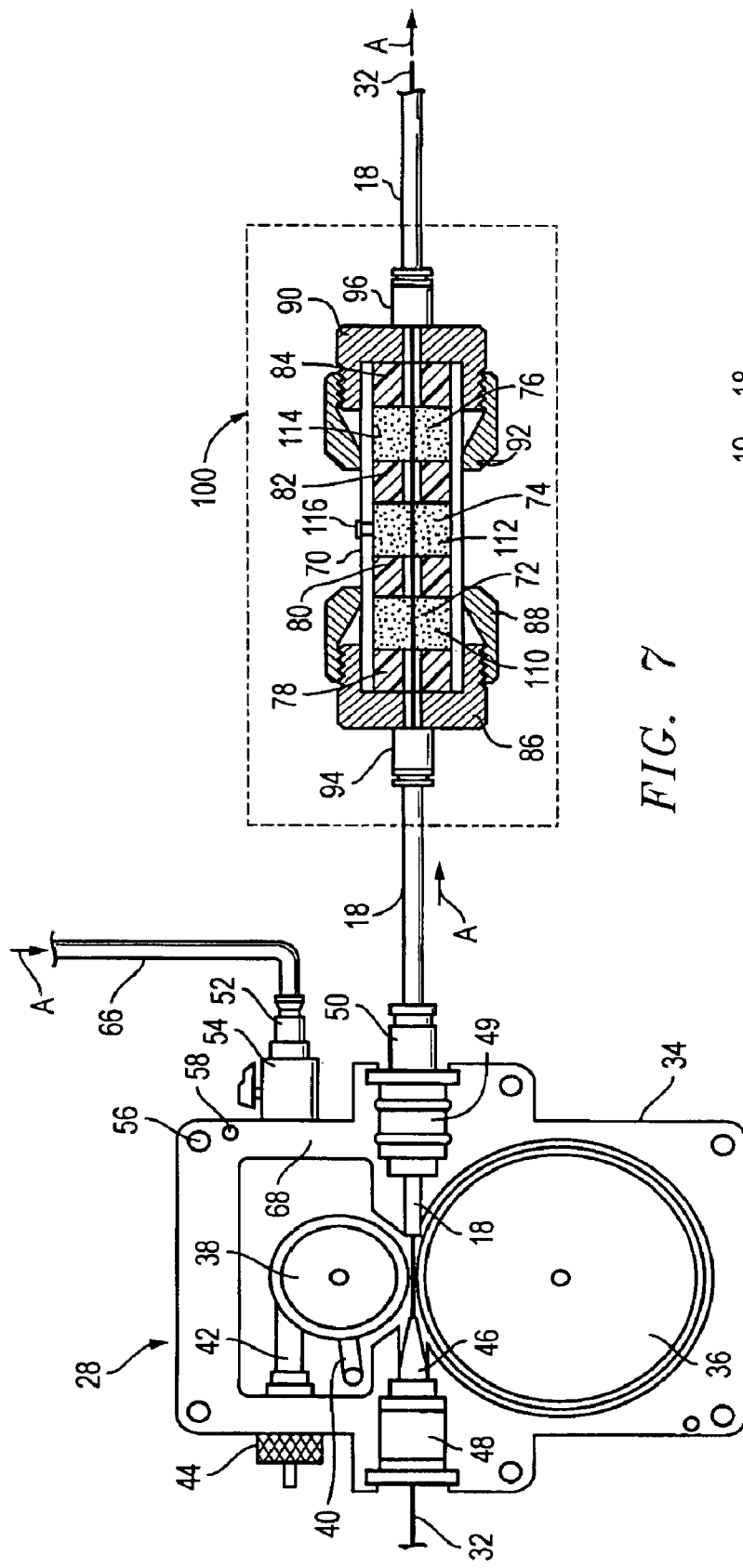
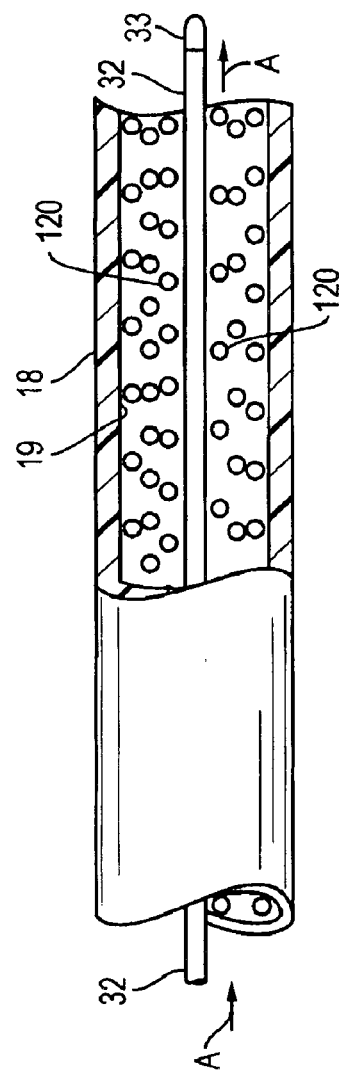
FIG. 7
FIG. 8

OPTICAL CABLE INSTALLATION WITH CABLE LUBRICATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to optical telecommunications networks, and in particular to methods and apparatus for installing fiber optic communication cables in ducts and conduits, including underground ducts and guide tubes that channelize the underground ducts.

Various factors must be considered when a fiber optic cable is installed in a protective duct. Some major concerns are the ease of installation and reduction in the amount of time needed to install the cable. Generally, it is desirable to install the longest continuous length of cable possible to reduce the number of splices needed for the cable run. Splices are time consuming to make and incur considerable installation costs. Moreover, it is not desirable to have a large number of splice joints in view of the relatively substantial signal damping caused by each joint in proportion to the total signal damping of the overall signal path.

Protective cable ducts have been channelized in an effort to satisfy these concerns. For this purpose one or more guide tubes, whose interior may have a lower coefficient of friction than the existing duct, are installed in the existing protective duct, thereby establishing separate channels in which cable, optionally at a later time, can be pulled through the protective duct over a greater length.

The pulling of fiber optic cables has now largely been replaced by a combination of blowing and synergetic pushing of the cables, e.g. such as described in U.S. Pat. Nos. 4,850,569 and 4,934,662 to Griffioen et al. This method is being used now for a variety of cables and ducts, from small (4 mm optical cables in 7/5.5 mm guide tubes, and currently 1.6 mm optical fiber cables in 4/3.2 mm guide tubes) to large (35 mm copper balanced cables in 63/50 mm ducts).

The theory of this pushing and blowing technique is described in EP 0734 109 B1 (Griffioen). According to this theory, cables with only a little play in the duct can be installed over long distances. Although the stiffness of the cable contributes more to the friction when passing bends and windings (undulations) in the duct trajectory, pushing becomes more efficient because the cable has less play to develop buckling. Even so, frictional effects have limited the installation lengths attainable by pushing and blowing techniques. Improvements in cable lubrication have been made to overcome those frictional limitations.

During the early development of pushing/blowing installation, cable lubrication was done by leading the cable through a box in contact with a lubricant, e.g., paraffin oil, before entering the cable blowing equipment and the protective duct. That conventional method has two limitations:

(a) The pusher wheels or capstans of most blowing equipments (most of them with the pusher wheels outside the pressurized space) slip over the cable when the cable is wet with lubricant.

(b) The seals from the cable inlet to the pressurized space scrape or blow away most of the lubricant.

For these reasons the method of lubricating a cable before it is launched has been abandoned by most operators. Instead, the duct is now lubricated before the cable is inserted. This is done by pouring a proper amount of lubricant into the duct, putting a foam plug behind and blowing the plug with lubricant through the duct. This method turned out to be a reliable and satisfactory way of lubricating conventional large diameter ducts. Another way to lubricate is pre-lubrication of the duct by the manufacturer (usually during the extrusion process).

For use in telecommunications access networks, e.g., "Fiber To The Home" (FTTH) systems with bundles of mini-tubes have been developed, for example as described in U.S. application Ser. No. 09/571,157 entitled "Installation of Guide Tubes in a Protective Duct," assigned to the owner of the present application and incorporated herein by reference. Here the mini-tubes become smaller and smaller, making it more difficult to lubricate with foam-plugs. More importantly, blowing many cables from one point to many different end-locations (houses or offices), and lubricating them with a blown foam plug every time, is rather impractical. Pre-lubricated ducts (by the manufacturer) have turned out not to be always reliable. A solution to these problems is given by the present invention as follows.

SUMMARY OF THE INVENTION

The present invention consists of a serially connected lubricator with foam-plugs and suitable lubricant, installed in the duct downstream of pushing/blowing cable launching equipment. The lubricator operates under pressure and the airflow, needed to blow the cable, is bypassed into the duct. Guide blocks to avoid buckling of the cable when pushed through the relatively large lubricating chamber are provided. The latter is especially important for smaller diameter cable with less stiffness.

The lubricator includes a lubrication compartment that is pressurized with airflow from the launching apparatus. The foam plugs, saturated with a viscous lubricant, are placed in the compartment for engaging the cable. As the cable is run through the pressurized compartment, lubricant is wiped onto the cable as it moves in contact with the foam plugs.

BRIEF DESCRIPTION OF THE DRAWINGS

FIG. 2 is a sectional view through the protective duct taken along the line 2—2;

FIG. 3 is a simplified schematic representation of cable launching equipment of FIG. 1 showing one embodiment of the cable lubricator.

FIG. 4 is a sectional view through the lubricator taken along the line 4—4.

FIG. 5 is a simplified elevational view, partly in section, of conventional cable pushing/blowing equipment and an alternative embodiment of the lubricator shown in FIG. 1, with airflow bypass.

FIG. 6 is an exploded perspective view of the internal components of the lubricator shown in FIG. 5.

FIG. 7 is a simplified elevational view, partly in section, of conventional cable pushing/blowing equipment and an alternative embodiment of the lubricator shown in FIG. 1, without airflow bypass.

FIG. 8 is an elevation view, partly in section, of a guide tube in which lubricant droplets, produced by the lubricator of FIG. 7, are entrained as an aerosol mixture in the pressurized airflow discharged from the lubricator as the cable is inserted through the guide duct.

FIG. 9 is a simplified flow diagram showing a plurality of lubricators cascaded at spaced locations in a protective duct trajectory in which a cable is being installed by pushing and blowing equipment.

FIG. 10 is a simplified flow diagram showing a plurality of lubricators installed at spaced locations in a protective duct trajectory in which a cable is being installed by a cascaded installation of pushing and blowing equipment.

DETAILED DESCRIPTION OF THE PREFERRED EMBODIMENTS

The invention will now be described on the basis of examples where cables are installed in protective underground cable ducts. Unless otherwise specified, all dimensions are given in metric units.

A portion of a typical underground fiber optic conduit network is schematically shown in FIG. 1. The network includes a longitudinally extending trajectory duct 10 or conduit, typically made of a sturdy plastic material, e.g., one and a quarter, one and a half or two inches in diameter. The conduit 10 is buried in the ground 12 and is carrying small diameter guide tubes in which fiber optic cables are to be installed. The conduit 10 and its cables typically extend several thousand feet, and a launching station, such as at a hand-hole 14, is located at a pre-determined central location. Here guide-tubes 16,18,20,22 and 24 extend out of the protective duct 10 (see also FIG. 2). In the hand-hole 14 also blowing/pushing equipment can be used in tandem operation. End caps 26 seal off the guide-tubes 20, 22, 24 where no cables have been installed.

A cable launching unit 28 is set up adjacent the hand-hole 14, in conjunction with a cable straightener unit 30, to introduce a fiber optic cable 32 into one of the guide tubes. A supply of new fiber optic cable, usually consisting of thousands of feet, is coiled or wound on a reel 34 positioned above ground. The cable 32 is unwound from the reel and is fed into the cable-straightening unit 30.

After the straightening step, the cable is fed into the cable launching unit 28, for example, a combination pushing and blowing cable insertion equipment of the type sold by Sherman & Reilly, Inc. of Chattanooga, Tenn., or as shown in U.S. Pat. No. 4,850,569, to which reference is made for whatever details described therein as may be necessary for the full understanding of the operation of the pushing and blowing unit.

The cable 32, coming from the straightener 30, is to be inserted into the underground guide tube 18. This is done with the synergetic blowing and pushing action of the insertion unit 28. Inside the housing 34 (two sections fastened together, see FIG. 5, only the bottom section of this equipment shown) the cable 32 is pushed by means of a mechanically (electric or pneumatic) driven wheel 36 that has an outer layer of machined hard metal with a groove for engaging the cable. In order to grip the cable a second (not mechanically driven) idler wheel 38 is pushed against the drive wheel 36. Pushing of the wheel 38, which can pivot on arm 40, is done via spring 42 by turning around the adjustment wheel 44 to control the pushing force of the drive wheel 38.

The cable 32 enters the housing 34 via a conical feed-through 46 that is cut to fit exactly the cable size. This feed-through is mounted on a splittable cylindrical entrance duct 48 that makes an airtight sealing when the housing is closed. The guide-tube 18 is received in a splittable cylindrical exit duct 49 also making airtight sealing. The guide tube 18 extends into the housing 34 until almost touching the wheels, to avoid buckling. Optionally the guide tube 18 can be mounted using a push/pull connector 50. Air is fed using a connection 52 via valve 54. The sections of the housing are closed with bolts and nuts through holes 56. For proper alignment, pin-and-holes 58 are used.

Referring again to FIG. 1, sources of compressed air and hydraulic power (or electric power) are connected to the cable feeder 28. Preferably, the compressed air A is provided by a compressor 64 through delivery conduit 66 at 175 to 375 cubic feet per minute (CFM) and 90 to 175 pounds per square inch (PSI). For the small size cables, installed in the guide tubes, in principle a capacity of 20 to 50 cubic feet per minute is sufficient.

An entrance duct clamp releasably holds the entrance duct for guiding the cable 32 toward the cable driver 36. Preferably, the entrance duct is a length of polyethylene tubing.

The air injection block 34 is provided with an entrance seal insert and an exit seal insert adapted to permit passage of the cable 32 while maintaining an airtight seal. The injection block 34, entrance seal insert and exit seal insert are each separable into two generally symmetrical halves to permit installation of the cable 32. The seal inserts are removable and replaceable with similar inserts adapted for different cable and conduit diameters. The entrance seal insert provides a passage slightly larger than the cable. A pair of gaskets is provided in the entrance seal insert to seal around the cable. A fitting is provided to permit injection of compressed air into the injection block 34.

The exit duct clamp is secured to the air injection block 34 to secure the duct to the injection block. The injection block defines a plenum 68 closed by the entrance seal insert and the exit seal insert. An end portion of the guide duct 18 is releasably held in the exit duct clamp. Preferably, the guide duct 28 is a length of cylindrical polyethylene tubing. A duct seal, such as a pair of gaskets, is provided to seal around the guide duct. The exit duct clamp and duct seal the injection block and guide duct to direct passage of air from the plenum into the guide duct.

Referring to FIG. 1, FIG. 2 and FIG. 9, prior to installation of the cable into the guide duct 18, a leading end of the cable 32 is sealed with a smooth plug or end cap 33 having a diameter only slightly larger than that of the cable, e.g. made of brass, or other low friction material. The end cap 33 is attached to the cable preferably by a screw-threaded union, and is tapered or torpedo-shaped and rounded on end to avoid sticking of the cable in the guide tube.

To set up the cable feeder 28, as shown in FIGS. 1 and 2, a length of cable is unrolled from the reel 34 and inserted in the entrance duct 48. The cable is positioned so that it extends from the end of the entrance duct approximately the length of the cable feeder. A cable 32 with the smooth end cap is inserted into the guide duct 18. The cable feeder is positioned adjacent the cable. The drive wheels, injection block, clamps and seal inserts are separated to provide a generally horizontal passage into which the cable is transversely inserted. The separated parts are then reassembled, closed, and secured to the entrance duct, cable, and guide duct in the cable feeder.

The compressed air, hydraulic source, and/or electric power are connected and initiated to pressurize the plenum 68 and to activate the hydraulic system and the control system. Compressed air A flows at high speed along the cable, propelling the cable through the guide duct. The actuator is switched on to provide hydraulic fluid (or compressed air or electric power) to the motors, and the drive wheels rotate, advancing the cable 32 through the conduit 18.

Figure 1:
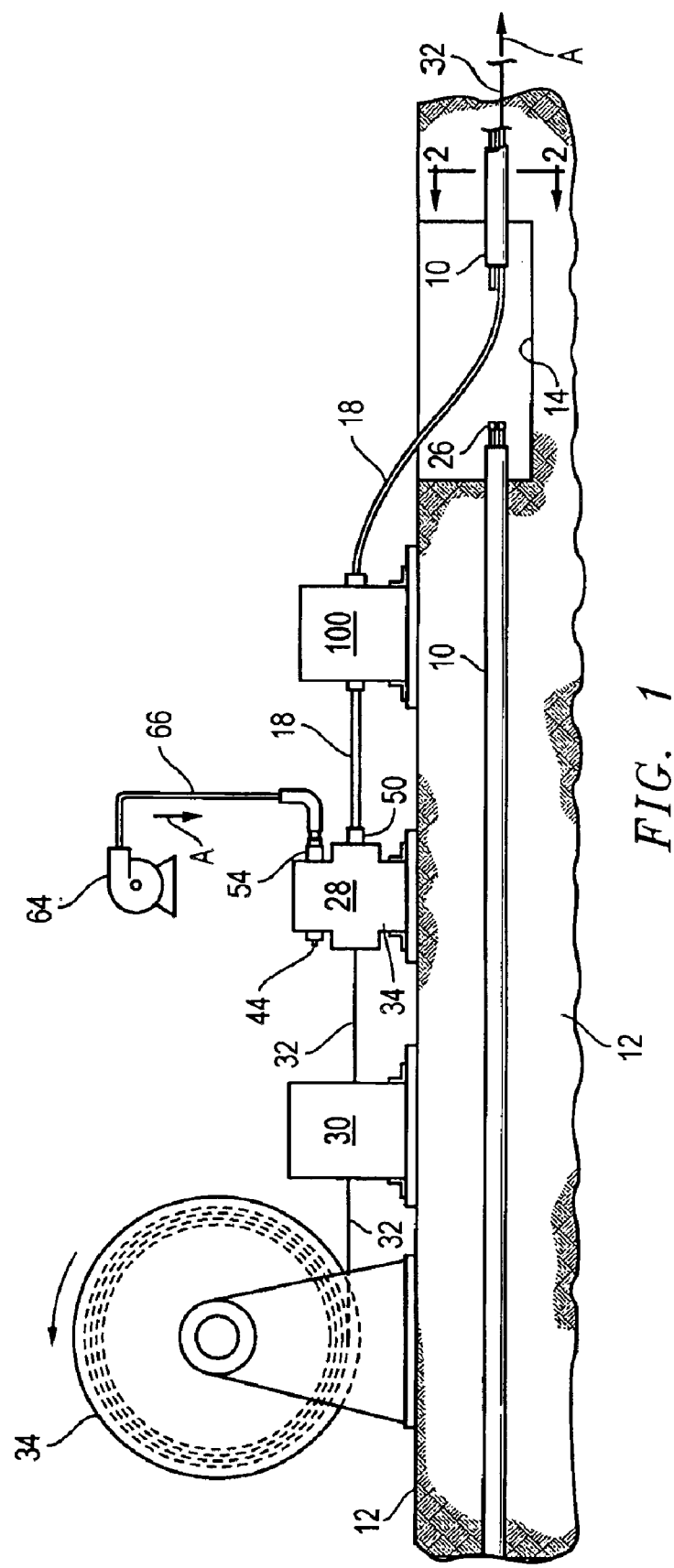
FIG. 1 is a simplified elevational view, partly in section, of a typical installation of optical fiber cable in a protective duct with cable launching equipment and a cable lubricator constructed according to the present invention.

According to the present invention, after the cable 32 exits the cable launching equipment 28 but prior to entry into the guide tube 18 in the protective underground duct 10, the cable 32 is lubricated by running it through a pressurized lubricator unit 100 as shown in FIG. 1, FIG. 3 and FIG. 5. Field-testing has demonstrated that the coefficient of friction of rubbing engagement of the cable against a protective duct (or guide tube) is a major limiting factor in determining how far a cable can be blown-in. Maximum blowing distance can be obtained when the blowing force equals the frictional force resisting movement of the cable. Consequently the maximum blowing distance varies substantially linearly with the coefficient of friction (through straight duct trajectories). It has been demonstrated by field testing that post-launch lubrication of the cable, under pressurized duct conditions, can substantially reduce the coefficient of friction in the duct, yielding a surprising increase in blowing distance by a factor of 10 or more as compared with the non-lubricated case.

Referring again to FIG. 1 and FIG. 2, a schematic representation is given of cable blowing equipment 28 in combination with the cable lubricator 100. The cable straightener 30 may be used in combination with relatively large cables having a large diameter (e.g., 3.9–5.0 mm) exceeding a certain minimum size, e.g., in the range of from 1.6 to 2.0 mm and smaller diameters, but is not preferred for use on the smaller cables.

In the preferred embodiment, micro-cables 32 with diameters ranging from 1.6 to 2.0 mm have been blown into guide tubes 16,18 having an outer diameter of 4 mm. In this embodiment, each cable contains two optical fiber strands F embedded in a uv-acrylate matrix reinforced with strands of aramid yarn and enclosed in a protective polymer jacket. In an alternative embodiment, each cable contains four optical strands F and a gel waterproofing material, for example silicone gel or aquagel, enclosed in a protective polymer jacket. In yet another cable embodiment, the fibers F are enclosed within a small diameter, thin sidewall laser-welded steel tube. This metal tube is loosely filled with one or more optical fibers and a gel waterproofing material, and a protective tubular jacket of (foamed) high-density polyethylene (HDPE) surrounds the small diameter steel tube.

The cable 32 is blown into the guide tube 18 using the cable blowing equipment 28, such as is described in "Optical Cable Installation with Mini-Bend Reduction." Immediately after the blowing equipment the cable lubricator 100 is placed, coupled to a lead-in section of the guide tube, and this lead-in section is extended, also by couplings, to the guide tube 18 into which the cable has to be installed.

In the exemplary embodiment shown in FIG. 5 and FIG. 7 the cable lubricator 100 consists of a cylindrical sidewall section of high density polyethylene (HDPE) duct 70 with an outer diameter of 40 mm and an internal cylindrical bore 71 forming a lubrication compartment into which compressed foam-plugs 72, 74, 76 (the size before compression, by a factor of about 3, shown in FIG. 6) and cylindrical cable guiders 78, 80, 82 and 84 are placed. The ends of the duct-housing 70 are closed air-tight (but not sealing the air flow in the longitudinal direction) using threaded duct-couplings 86, 88 and 90, 92 on which tubular connector fittings 94, 96 to the 4 mm guide tubes have been mounted.

In the preferred embodiment, a large fraction A1 of the pressurized airflow A is shunted or bypassed around the lubricator into the duct via T-connectors 98, 102, angled connectors 104, 106 and a bypass conduit 108. The smaller remainder fraction A2 of the pressurized airflow passes through the longitudinal airflow passage of the lubricator compartment 71 in contact with the foam-plug applicators 72, 74 and 76.

The cable 32 is pushed through the cable lubricator 100 in wiping contact with the foam plugs during blowing. To eliminate buckling of the cable in the relatively large space (compared to the 4 mm diameter guide tube) of the 40 mm diameter lubrication compartment 71, the cable is guided at several places within the compartment. The bore size of the 4 mm tube connectors 94, 96 and duct-coupling 86, 90 is formed a little larger than the cable, in this embodiment 2.5 mm. Wiping apertures 72A, 74A and 76A have been punched into the foam-plugs before mounting.

To further eliminate cable buckling, cylindrical cable guiders 78, 80, 82 and 84, made of a rigid plastic material such as nylon, are placed in the lubrication compartment in interleaved relation with the foam plugs. Radial deflection of the cable as it moves through the lubrication compartment is limited by passing the cable through guide apertures 78A, 80A, 82A and 84A formed through the cable guiders. Also here the size of the guide apertures in the cable guiders is 2.5 mm. The guide apertures have conical counterbore inlet pockets to ease pushing of a (new) section of cable through the cable lubricator. The longitudinal dimensions of the cable-guiders 78, 80, 82 and 84 are chosen long enough such that tilting of the guiders in the duct housing 70 is avoided sufficiently to guide the cable without kinking. These lengths may be shorter when the cable guiders are supported and fixed in the lubricator.

The cable-guiders 78, 80, 82 and 84 also divide or partition the cable lubricator compartment into separate sub-compartments 110, 112 and 114. In this way it becomes possible to start with a "very wet" (saturated) foam-plug 72, in order to be sure that enough lubricant is applied and to provision the reservoir with as much lubricant as possible. The first compartment 110 could also contain lubricant only, without a foam-plug, and the last compartment 114 would contain a "just wet" foam-plug 76. The foam-plugs 74 in between can vary from "wet" to "dry."

Preferably, each foam plug is a little less "wet" starting from the first "wet" foam plug 72, thereby forming a lubrication gradient within the pressurized lubrication passage. This arrangement applies a thin film of lubricant rather than a thick viscous layer that would cause the cable to stick to the duct sidewall. Also, this arrangement ensures a transfer of lubricant from the more-wet compartments to the less-wet compartments, thus avoiding premature drying out of the less-wet foam plugs.

Installation of the cable lubricator 100 is accomplished as follows. The T-connectors 98,102, duct-couplings 86, 88, duct-housing 70, foam-plugs 72, 74, 76 and cable guiders 78, 80, 82, 84 are first shifted in order over the cable 32. Then the cable-guiders and the foam-plugs are pressed into the duct-piece (the foam-plugs have to be squeezed and compressed for proper fitting). Next the duct-couplings are screwed to the duct housing. Finally the air-bypass conduit is connected to the T-connectors to complete the cable lubricator. Then the cable 32 can be blown into guide tubes connected to the cable lubricator.

For new installations the cable 32 is cut in front of the cable lubricator 100 and a new lead-in section of guide tube is connected. When the cable reel is empty a new cable can be mechanically coupled to the old cable and pushed through the cable straightner 30, cable blowing equipment 28 and cable lubricator 100. It is also possible to use a straight rod, which is pushed through an empty cable lubricator without opening it, attach the cable to it, and then pull the cable through the lubricator.

When all lubricant is used or the foam plugs become too dry to be effective, the cable lubricator can be opened and refilled through a sealable access port, for example via a screw cap fitting 116 (FIG. 3 and FIG. 4), mounted air-tight and extending through the by-pass housing 130. It is also possible to use a lubricating nipple with an internal check valve for refill. The lubricant should be a viscous lubricating material that can flow and be absorbed into a fluid permeable applicator. Various lubricants are available from commercial sources and can be used for cable lubrication purpose. However, a water-based emulsion lubricant sold by American Polywater Corporation of Stillwater, Minn. under its trademark Polywater®Prelube™2000 is preferred. That lubricating material has the consistency of hand lotion under ambient conditions and is readily absorbed into open cell plastic foam materials, natural sponges, woven fiber wicks and other fluid permeable applicator materials.

Various fluid permeable materials can be used to fabricate the lubricant applicator plugs, including synthetic foams, natural sponges and woven fiber wicks. In the preferred embodiment, the preferred fluid permeable applicator material is a resilient cellular plastic foam, such as open cell polyether or polyester polyurethane foam, rubber latex, and polyethylene or vinyl polymers. When a polyurethane foam is used, the foam has a nominal density in the range of about 0.6 to about 1.2, preferably about 0.8 to about 1.0 pounds per cubic foot, and an indentation force deflection (IFD) in the range of about 4 to about 15, preferably about 8 to about 12 pounds. (Test Method ASTM D3574)

The nominal density in pounds per cubic foot (PCF) polyurethane foam applicator material in one embodiment as measured according to ASTM D3574 is 0.5 to 5 PCF, in one embodiment 0.75 to 2 PCF, and in one embodiment 1.25 to 1.35 PCF. The foam firmness measured in terms of indentation force deflection (IFD) under ASTM D3574, also referred to as initial load deflection (ILD), for the foam plug material in one embodiment is 15 to 100 lbs, in one embodiment 45 to 55 lbs, and in one embodiment 50 to 52 lbs, respectively. Open cell foams, having the foregoing range of densities and ILD values are compressible under mechanical pressure and will return to their original shape when the pressure is removed.

The cable lubricator 100 can function well with bypass airflow Al as shown in FIG. 3 and FIG. 5, applying a thin film of lubricant on the cable jacket. In these embodiments bypass airflow is provided by the conduit 108 that is coupled in parallel airflow relation with the lubricator airflow passage 71 for diverting substantially all of the pressurized airflow around the applicator and into the duct for blowing-assisted transport of the cable through the duct trajectory.

Bypass airflow is also provided by the alternative lubricator embodiment shown in FIG. 3 and FIG. 4. In this arrangement, the airflow bypass means is formed by a large diameter housing shell 130 that completely encloses the lubricator housing 70. The lubricator is radially spaced from the tubular housing and is held in cable-running alignment with the housing shell by radial spacer fins 132, 134 and 136. The annulus 138 between the housing shell and lubricator housing 70 forms a bypass airflow passage for conveying a large fraction Al of the pressurized airflow from the launch apparatus 28 into the guide tube 18.

In this alternative embodiment the airflow passage of the lubricator is pressurized by a relatively small airflow A2. Only a single foam-plug absorbent applicator 72 is placed in the lubricant reservoir housing for wiping lubricant onto the cable 32 as it moves through the pressurized airflow passage 71. This arrangement may be used for running relatively stiff cable for which cable-guiders are not needed, e.g., fiber optic cable in which the fibers are enclosed in small diameter steel tubing.

It is also possible to block or eliminate the bypass airflow as shown in FIG. 7, whereby the entire pressurized airflow A is discharged through the lubricator 100. In that case a sufficient amount of pressurized air will still flow through the holes in the duct-couplings and cable-guiders, and also through the foam-plugs, to propel the cable through the guide tube.

With full airflow through the lubricator (FIG. 7), small lubricant droplets 120 are stripped away from the foam plugs and become entrained in the pressurized airflow as a "shower" of lubricant droplets, thus forming an aerosol mixture that lubricates the bore 19 of the guide tube 18 as the droplets disperse through the guide tube, as shown in FIG. 8. The nature of this "shower" depends on the air pressure, length of the guide tube in which the cable is installed and on the lubricant filling of the cable lubricator. Trial and error will determine the parameters for best lubricating effect by this method.

Figure 9:
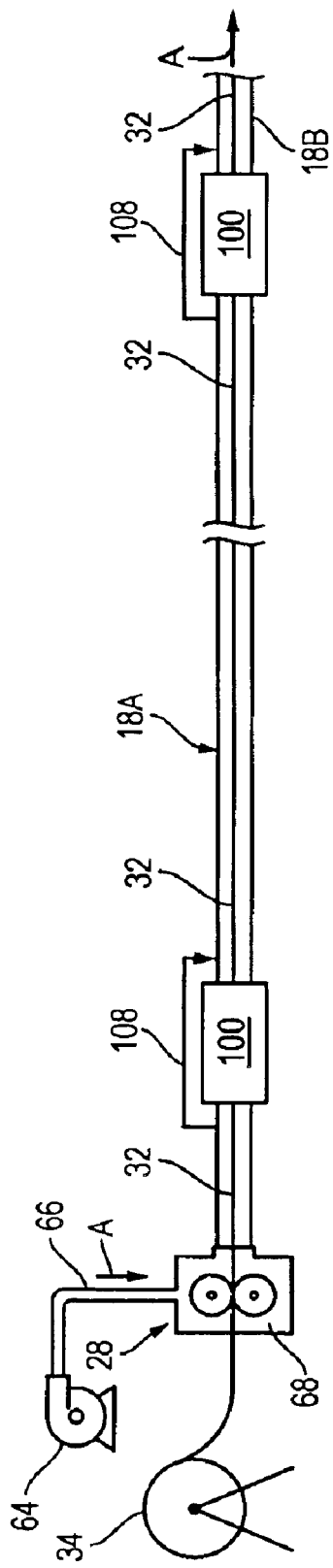

It is also possible, by using a splittable duct access fitting, to place one or more additional cable lubricators 100 further in the duct trajectory, for example in series with tandem duct sections 18A and 18B as shown in FIG. 9. In this cascade arrangement of lubricators, where the mechanical pushing forces provided by the initial cable launching equipment 28 may be absent or very small, the friction forces of the cable through the cable lubricator will be low enough to allow the viscous forces of the bypass airflow Al to compensate for the reduced pushing force at the remote locations.

Figure 10:
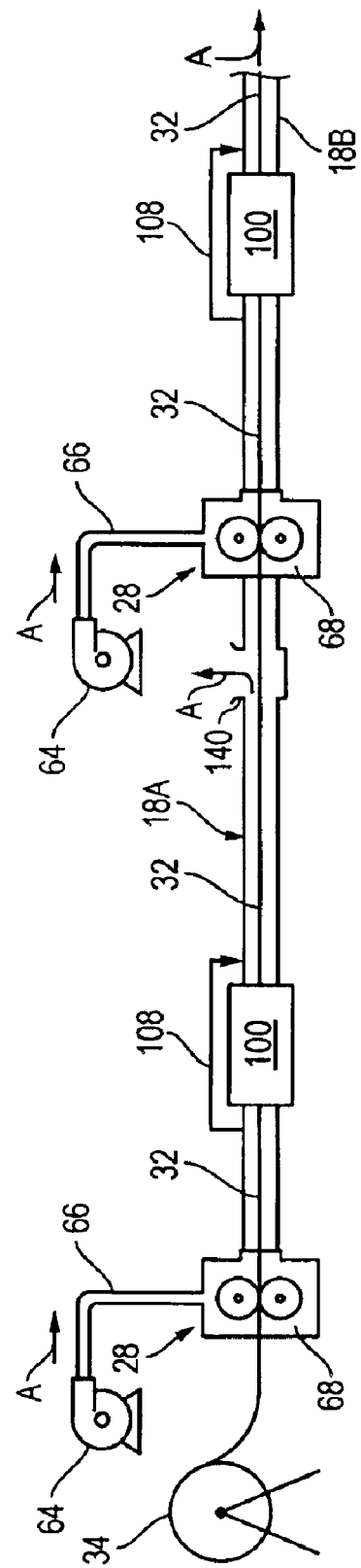

Also additional pushing/blowing equipment 28, 64 with an additional lubricator 100 can be placed further in the duct trajectory, blowing and lubricating in tandem (cascade). This can be done at one or more remote operative positions in the tandem duct sections 18A and 18B of the duct trajectory downstream of the initial cable launching equipment 28, as shown in FIG. 10. There is a vent fitting 140 installed in the duct section 18A just before reaching the second blowing station. The vent 140 exhausts the pressurized airflow A from the first blower out of the duct section 18A before it reaches the second duct section 18B. By this arrangement there is no airflow communication between the duct sections, since there is no practical way to combine the airflow from the first blower into the plenum of the second blower. The airflow and pushing forces from the first blowing station supplies the needed propelling forces for the cable over the first duct section 18A. The second launching apparatus will also propel the cable, but the new airflow provided by the second blower is only effective in the second duct section 18B, downstream of the second blower.

EXAMPLES

These tests were performed with the FIG. 5 lubricator embodiment (air bypass open). Blowing was done with 10 bars air-pressure unless otherwise specified. In all experiments the guide tubes were open at 585 meters from the point where the cable is launched.

Example 1

PBTP 2.0 mm Cable in Un-Lubricated Ribbed 4 mm Tube

First attempt: Un-lubricated installation. Blowing transport of cable started with a rate of advance of 35 m/min but stopped because of frictional resistance after reaching only 50 m in the duct trajectory.

Second attempt: Lubricating the tube with water-based lubricant and a foam-plug blown through. Blowing transport of cable started with a rate of advance of 35 m/min and the speed had dropped to 7 m/min after reaching 225 m in the duct trajectory.

Third attempt: Using the cable lubricator (and another unlubricated tube). Blowing started with 35 m/min and the speed had dropped to 8 m/min after reaching 500 m in the duct trajectory.

Example 2

Nylon 1.8 mm Cable in Pre-Lubricated Ribbed 4 mm Tube

First attempt: Installation with no further lubricating. Blowing started with 35 m/min and the speed dropped to 5 m/min at reaching 235 m in the duct trajectory.

Second attempt: Using the cable lubricator (and another unlubricated tube). Blowing started with 35 m/min and the speed was still the same upon reaching 585 m in the duct trajectory while the pressure was only 7 bars.

The effect of post-launch lubrication with the pressurized cable lubricator 100 is an improvement by a factor of 10 or more in blowing length with respect to the non-lubricated case. Moreover the blowing results reproduce better when using the cable lubricator. The blowing distance improvement of the cable lubricator is also much more striking than the improvement of lubricating the guide tubes alone (or using pre-lubricated tubes), which was an unexpected and surprising improvement.

For the sake of completeness, it is further noted that the lubrication method of the invention is suitable for installing copper wire cables and power cables as well as optical fiber cables.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. A lubricator for applying a lubricant to a cable as it is being propelled at least in part by pressurized air blowing-assisted transport through a duct, comprising a housing forming an airflow passage for conveying pressurized air and allowing longitudinal movement of the cable through the lubricator, an inlet coupling portion for admitting pressurized airflow and the cable into the airflow passage, an outlet coupling portion for directing the cable and pressurized airflow into the duct and an applicator disposed within the housing for applying a lubricant onto the cable as the cable moves through the airflow passage.

2. A cable lubricator as set forth in claim 1, including airflow bypass means coupled in parallel airflow relation with the lubricator airflow passage for diverting a substantial portion of the pressurized airflow around the applicator and into the duct.

3. A cable lubricator as set forth in claim 2, wherein the airflow bypass means comprises a tubular conduit having an inlet end portion coupled in fluid communication with the airflow passage upstream of the applicator and an outlet end portion coupled in fluid communication with the airflow passage downstream of the applicator.

4. A cable lubricator as set forth in claim 2, wherein the airflow bypass means comprises a tubular housing for connection in an operative position between a source of compressed air and a duct, the lubricant applicator being enclosed within and spaced from the tubular housing in cable-running alignment with the duct in the operative position thereby forming a bypass airflow passage around the applicator for conveying pressurized air from the source into the duct.

5. A cable lubricator as set forth in claim 1, including means partitioning the airflow passage into two or more longitudinally spaced compartments, and an applicator disposed in at least one of the compartments for applying a lubricant to the cable as it moves through the airflow passage.

6. A cable lubricator as set forth in claim 1, including means partitioning the airflow passage into two or more longitudinally spaced compartments an applicator disposed in at least one of the compartments for applying a lubricant to the cable as it moves through the airflow passage, and a sealable refill access pout coupled to at least one of the compartments for replenishment of lubricant therein.

7. A cable lubricator as set forth in claim 1, including one or more cable guide blocks partitioning the airflow passage into longitudinally spaced compartments and an applicator disposed in at least one of the compartments for applying a lubricant to the cable as it moves through the airflow passage, each guide block including a body portion intersected by a longitudinal bore permitting free longitudinal movement of the cable while limiting radial deflection movement of the cable as the cable moves through the lubricator.

8. A cable lubricator as set forth in claim 1, including means partitioning the airflow passage into first, last and one or more intermediate compartments that are longitudinally spaced apart, and a plug of a flexible, fluid permeable material disposed in each compartment for wiping application of a viscous lubricant onto the cable as it moves through the airflow passage.

9. A cable lubricator as set forth in claim 8, characterized in that a volume of a viscous lubricant is absorbed in each wiping plug, with each successive wiping plug containing a respectively lesser amount of lubricant such that a lubrication gradient is established in the airflow passage varying from very wet in the first wiping plug to just wet in the last wiping plug, with one or more intermediate Wiping plugs varying from wet to less wet.

10. A cable lubricator as set forth in claim 1, including one or more cable guide blocks partitioning the airflow passage into a plurality of longitudinally spaced compartments, each guide block including a body portion intersected by a longitudinal bore permitting free longitudinal movement of the cable while limiting radial deflection movement of the cable as the cable moves through the lubricator, at least one of the compartments defining a reservoir for containing a volume of viscous lubricant and an applicator is disposed in at least one of the compartments for applying a viscous lubricant to the cable as it moves through the airflow passage.

11. A cable lubricator as set forth in claim 1, wherein the applicator comprises fluid permeable means for introducing a shower of lubricant droplets into the compressed air flowing into the duct.

12. A cable lubricator as set forth in claim 1, wherein the lubricant applicator comprises a resilient, open cell plastic foam material.

13. A cable lubricator as set forth in claim 12, wherein the foam material is selected from the group consisting of polyether polyurethane foams, polyester polyurethane foams, rubber latex, polyethylene polymers and vinyl polymers.

14. A cable lubricator as set forth in claim 12, wherein the foam is polyether polyurethane foam having a nominal density in the range of about 0.6 to 1.2 pounds per cubic foot.

15. A cable lubricator as set forth in claim 12, wherein the foam material is polyether polyurethane foam having a nominal density in the range of about 0.6 to about 1.2, preferably about 0.8 to about 1.0 pounds per cubic foot, and an indentation force deflection (IFD) in the range of about 4 to about 15, preferably about 8 to about 12 pounds, respectively.

16. A cable lubricator as set forth in claim 12, wherein the foam material is polyester polyurethane foam having a nominal density in the range of about 0.5 to 5 pounds per cubic foot, preferably about 0.75 to 2 pounds per cubic foot, and more preferably about 1.25 to 1.35 pounds per cubic foot, and a corresponding foam firmness measured in terms of initial load deflection in the range of 15 to 100 lbs, preferably 45 to 55 lbs, and most preferably 50 to 52 lbs, respectively.

17. A cable lubricator as set forth in claim 1, wherein the lubricant applicator comprises a fluid permeable wick of woven fibers.

18. A cable lubricator as set forth in claim 1, wherein the lubricant applicator comprises a resilient, compressible natural sponge material.

19. A cable lubricator for connection in an operative position between a source of compressed air and a duct through which a cable is being propelled at least in part by pressurized air blowing-assisted transport, the cable lubricator comprising a housing forming an airflow passage for conveying pressurized air from the source into the duct, and means disposed in the housing for applying lubricant onto the cable as it moves through the pressurized airflow passage.

20. A cable lubricator a set forth in claim 19, including cable guide means disposed in the housing for guiding the cable through the airflow passage substantially in cable-running alignment with the duct.

21. Apparatus for installing a cable in a duct comprising, in combination:

a launching apparatus including a source of pressurized air for propelling a cable at least in part by pressurized air blowing-assisted transport in the duct; and a cable lubricator connected in an operative position between the launch apparatus and the duct, the cable lubricator including a housing forming an airflow passage for conveying pressurized air from the launch apparatus into the duct, and means disposed in the housing for applying lubricant onto the cable as it moves through the pressurized airflow passage.

22. Apparatus for installing a cable in a duct as set forth in claim 21, including:

apparatus coupled in bypass flow relation with the lubricator for diverting a substantial fraction of the pressurized airflow around the lubrication compartment into the duct downstream of the cable lubricator for assisting blowing transport of the cable through the duct.

23. Apparatus for installing a cable as set forth in claim 21, the cable lubricator including:

cable guide means disposed in the housing for limiting radial deflection of the cable as it moves through the airflow passage.

24. Apparatus for installing a cable in a first duct section and a second duct section of a duct trajectory comprising, in combination:

a launching apparatus including a source of pressurized air for propelling a cable at least in part by pressurized air blowing-assisted transport in the duct trajectory;

a first cable lubricator connected in a first operative position between the launching apparatus and the first duct section, the first cable lubricator including a housing forming an airflow passage for conveying pressurized air from the launching apparatus into the first duct section, and means disposed in the lubricator housing for applying lubricant onto the cable as it moves through the airflow passage off the first lubricator, first bypass apparatus coupled in bypass flow relation with the first lubricator for diverting a substantial fraction of the pressurized airflow around the lubrication compartment into the first duct section downstream of the first cable lubricator for assisting blowing transport of the cable through the duct trajectory;

a second cable lubricator connected between the first duct section and the second duct section further in the duct trajectory at a location downstream relative to the first cable lubricator, the second cable lubricator including a housing forming an airflow passage for conveying pressurized airflow from the first duct section into the second duct section, and means disposed in the housing of the second lubricator for applying lubricant onto the cable as it moves through the airflow passage of the second lubricator; and second bypass apparatus coupled in bypass flow relation with the second cable lubricator for diverting a substantial fraction of the pressurized airflow around the lubrication compartment of the second lubricator into the second duct section for assisting blowing transport of the cable through the duct trajectory.

25. Apparatus for installing a cable in a first duct section and a second duct section of a duct trajectory comprising, in combination:

first launching apparatus including a first source of pressurized air for propelling a cable at least in part by pressurized air blowing-assisted transport in the first section of the duet trajectory;

a first cable lubricator connected in a first operative position between the first launching apparatus and the first duct section, the first cable lubricator including a housing forming an airflow passage for conveying pressurized air provided by the first launching apparatus into the first duct section, and means disposed in the lubricator housing for applying lubricant onto the cable as it moves through the airflow passage;

first bypass apparatus coupled in bypass flow relation with the first lubricator for diverting a substantial fraction of the pressurized airflow around the lubrication compartment into the first duct section downstream of the first cable lubricator for assisting blowing transport of the cable through the first duct section;

a second launching apparatus disposed in cable running alignment between the first duct section and the second duct section further in the duct trajectory for receiving the cable at a remote location downstream relative to the first launching apparatus, the second launching apparatus including a second source of pressurized air for propelling the cable at least in part by pressurized air blowing-assisted transport in the second section;

a second cable lubricator connected in a second operative position between the second launch apparatus and the second duct section, the second cable lubricator including a housing forming an airflow passage for conveying pressurized air provided by the second launching apparatus into the second duct section, and means disposed in the lubricator housing for applying lubricant onto the cable as it moves through the pressurized airflow passage into the second duct section; and second bypass apparatus coupled in bypass flow relation with the second cable lubricator for diverting a substantial fraction of the pressurized airflow around the lubrication compartment of the second lubricator into the second duct section for assisting blowing transport of the cable through the duct trajectory.

26. Apparatus for installing a cable in a first duct second duct section of a duct trajectory as set forth in claim 25, including a vent fitting installed in the first duct section for exhausting the pressurized airflow out of the first duct section at a location near the point of entry of the cable into the second launching apparatus.

* * * * *